US011760366B2

(12) United States Patent
Aoyagi et al.

(10) Patent No.: US 11,760,366 B2
(45) Date of Patent: Sep. 19, 2023

(54) VEHICLE CONTROL APPARATUS, VEHICLE, VEHICLE CONTROL METHOD, AND NON TRANSITORY COMPUTER READABLE STORAGE MEDIUM

(71) Applicant: HONDA MOTOR CO., LTD., Tokyo (JP)

(72) Inventors: Akihiko Aoyagi, Wako (JP); Kanta Tsuji, Wako (JP); Tadahiko Kanoh, Wako (JP); Takuyuki Mukai, Wako (JP); Jun Ochida, Wako (JP); Yasuharu Hashimoto, Wako (JP); Yuichi Komori, Wako (JP); Takashi Kuboshima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 273 days.

(21) Appl. No.: 17/155,178

(22) Filed: Jan. 22, 2021

(65) Prior Publication Data

US 2021/0229683 A1 Jul. 29, 2021

(30) Foreign Application Priority Data

Jan. 29, 2020 (JP) .................................. 2020-012843

(51) Int. Cl.
*B60W 50/02* (2012.01)
*B60W 50/14* (2020.01)

(52) U.S. Cl.
CPC ........ *B60W 50/0205* (2013.01); *B60W 50/14* (2013.01); *B60W 2050/021* (2013.01); *B60W 2050/0215* (2013.01); *B60W 2520/14* (2013.01)

(58) Field of Classification Search
CPC ............. B60W 50/0205; B60W 50/14; B60W 2050/021; B60W 2050/0215;
(Continued)

(56) References Cited

U.S. PATENT DOCUMENTS 5,212,640 A * 5/1993 Matsuda ............ B60G 17/0185
701/29.2
9,511,756 B2 * 12/2016 Nijakowski ........... B60W 10/10
(Continued)

FOREIGN PATENT DOCUMENTS

| JP | 2016181031 A | 10/2016 |
|----|--------------|---------|
| WO | 2018220811 A1 | 12/2018 |
| WO | 2019/116870 A1 | 6/2019 |

OTHER PUBLICATIONS

Japanese Office Action in related, co-pending patent application No. JP2020-012843, dated Jun. 4, 2021.
(Continued)

*Primary Examiner* — Jeff A Burke
*Assistant Examiner* — Sihar A Karwan
(74) *Attorney, Agent, or Firm* — Thomas | Horstemeyer, LLP

(57) ABSTRACT

A vehicle control apparatus includes a first control unit and a second control unit each configured to perform travel control of a vehicle based on a recognition result of an external recognition device group configured to obtain external information of the vehicle and a detection result of a vehicle information detection unit configured to obtain state information of an actuator group of the vehicle. In a case in which functional degradation of at least one of the external recognition device group, the actuator group, and the vehicle information detection unit is detected, based on the recognition result and the detection result, the first control unit determines contents of vehicle control in fallback control for restricting a travel control function of the vehicle and determines whether to execute the fallback control by one of the first control unit and the second control unit.

20 Claims, 5 Drawing Sheets

(58) Field of Classification Search
CPC ......... B60W 2520/14; B60W 60/0059; B60W 2050/022; B60W 60/00186; B60W 60/0018; B60W 50/029; B60W 60/0016; B60W 60/005; B60W 2050/0292; B62D 5/04; B62D 6/00

See application file for complete search history.

(56) References Cited

U.S. PATENT DOCUMENTS

| | | | |
|---|---|---|---|
| 11,237,555 B1* | 2/2022 | Chan | G05D 1/0077 |
| 2005/0212666 A1* | 9/2005 | Kawazoe | G05D 1/0227 340/436 |
| 2008/0243337 A1* | 10/2008 | Tsuda | B60W 50/14 701/41 |
| 2012/0041632 A1* | 2/2012 | Garcia Bordes | B60W 50/14 701/29.1 |
| 2016/0068103 A1* | 3/2016 | McNew | B60W 50/14 701/23 |
| 2019/0079513 A1* | 3/2019 | Greenfield | B60W 50/029 |
| 2020/0298871 A1 | 9/2020 | Mukai et al. | |
| 2020/0334099 A1* | 10/2020 | Hayes | G06F 11/0721 |
| 2021/0163026 A1 | 6/2021 | Ochida et al. | |
| 2021/0300392 A1* | 9/2021 | Shionome | B60R 16/0232 |

OTHER PUBLICATIONS

Partial English translation of the Office Action dated Jun. 4, 2021, concerning Japanese Patent Application No. 2020-012843.

* cited by examiner

VEHICLE CONTROL APPARATUS, VEHICLE, VEHICLE CONTROL METHOD, AND NON TRANSITORY COMPUTER READABLE STORAGE MEDIUM

CROSS-REFERENCE TO RELATED APPLICATION(S)

This application claims priority to and the benefit of Japanese Patent Application No. 2020-012843 filed on Jan. 29, 2020, the entire disclosure of which is incorporated herein by reference.

BACKGROUND OF THE INVENTION

Field of the Invention

The present invention relates to a vehicle control apparatus, a vehicle, a vehicle control method, and a non-transitory computer-readable storage medium, and more specifically to a vehicle control technique for an automated driving vehicle.

Description of the Related Art

International Publication No. 2019/116870 discloses an automated driving control apparatus that includes a mam ECU and a sub-ECU. In the automated driving control apparatus disclosed in International Publication No. 2019/116870, in a case in which the functions of the main ECU and the actuator and the sensors which operate based on a control signal transmitted from the mam ECU have changed, the main subject of vehicle control will be switched from the mam ECU to the sub-ECU, and the sub-ECU will execute fallback control that restricts a travel control function of a vehicle.

However, if a time lag occurs in communication when the mam subject of travel control is to be switched from the main ECU to the sub-ECU, fallback control may not be able to be executed smoothly. Also, depending on the Ape of actuator and sensors whose functions have changed, the main ECU which has a higher processing performance than the sub-ECU may be able to perform vehicle control more smoothly and stably in some cases.

In consideration of the above problem, the present invention provides a vehicle control technique that can determine, based on a recognition result of external information and a detection result of state information of a vehicle, the contents of vehicle control in fallback control that restricts a travel control function of the vehicle and the main subject which is to execute the fallback control.

SUMMARY OF THE INVENTION

According to one aspect of the present invention, there is provided a vehicle control apparatus that includes a first control unit and a second control unit each configured to perform travel control of a vehicle based on a recognition result of an external recognition device group configured to obtain external information of the vehicle and a detection result of a vehicle information detection unit configured to obtain state information of an actuator group of the vehicle, wherein in a case in which functional degradation of at least one of the external recognition device group, the actuator group, and the vehicle information detection unit is detected, based on the recognition result and the detection result, the first control unit determines contents of vehicle control in fallback control for restricting a travel control function of the vehicle and determines whether to execute the fallback control by one of the first control unit and the second control unit.

According to another aspect of the present invention, there is provided a vehicle control method of a vehicle control apparatus that includes a first control unit and a second control unit each configured to perform travel control of a vehicle based on a recognition result of an external recognition device group configured to obtain external information of the vehicle and a detection result of a vehicle information detection unit configured to obtain state information of an actuator group of the vehicle, the method comprising:

causing, in a case in which functional degradation of at least one of the external recognition device group, the actuator group, and the vehicle information detection unit is detected, based on the recognition result and the detection result, the first control unit to determine contents of vehicle control in fallback control for restricting a travel control function of the vehicle and determine whether to execute the fallback control by one of the first control unit and the second control unit.

According to the present invention, the contents of vehicle control in fallback control which restricts functions of travel control of a vehicle and the main subject which is to execute the fallback control can be determined based on the recognition result of external information and the detection result of state information of the vehicle.

BRIEF DESCRIPTION OF THE DRAWINGS

The accompanying drawings, which are incorporated in and constitute a part of the specification, illustrate embodiments of the invention and, together with the description, serve to explain the present invention.

DESCRIPTION OF THE EMBODIMENTS

Figure 1:
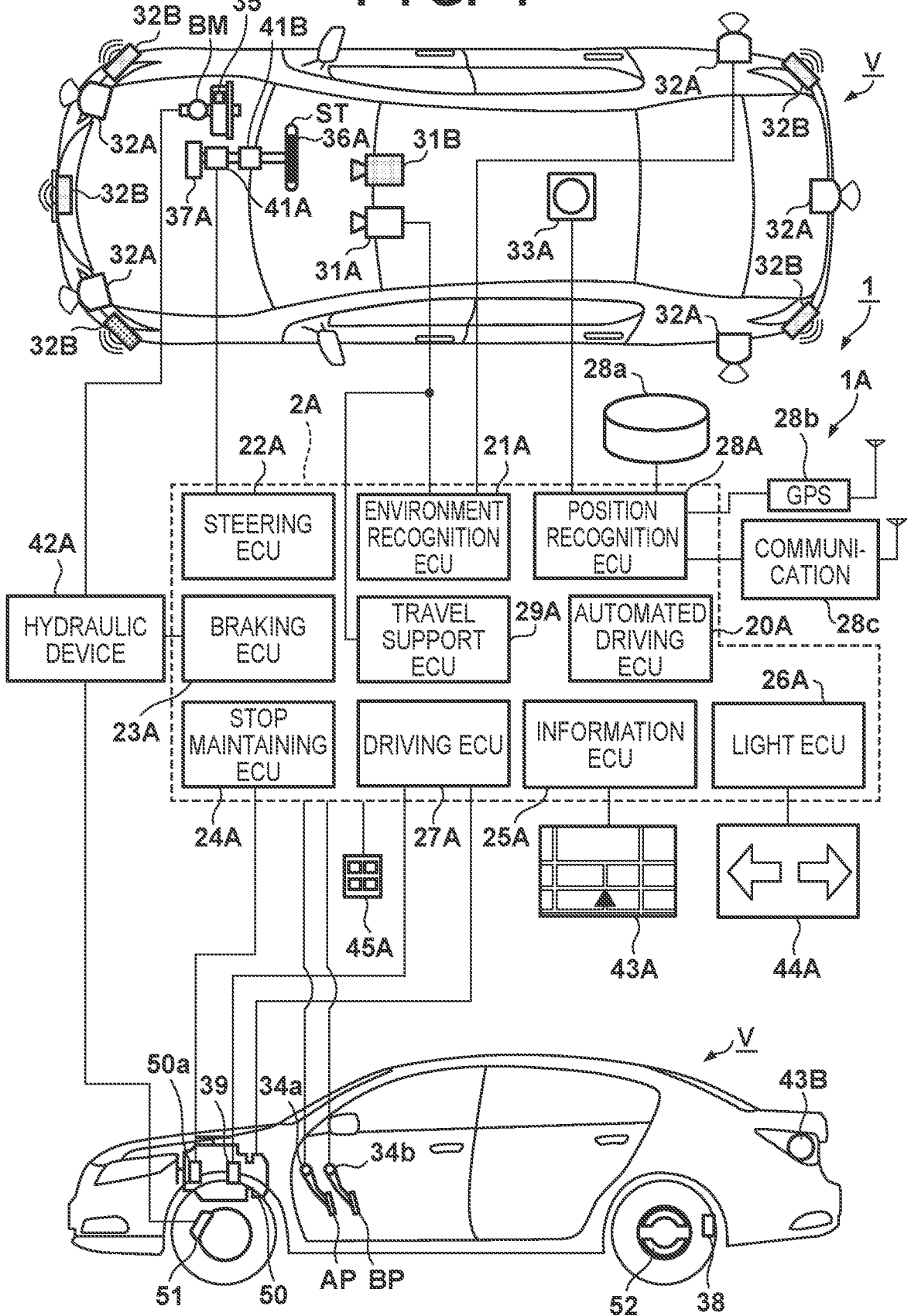
FIG. 1 is a block diagram of a vehicle control apparatus according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Figure 2:
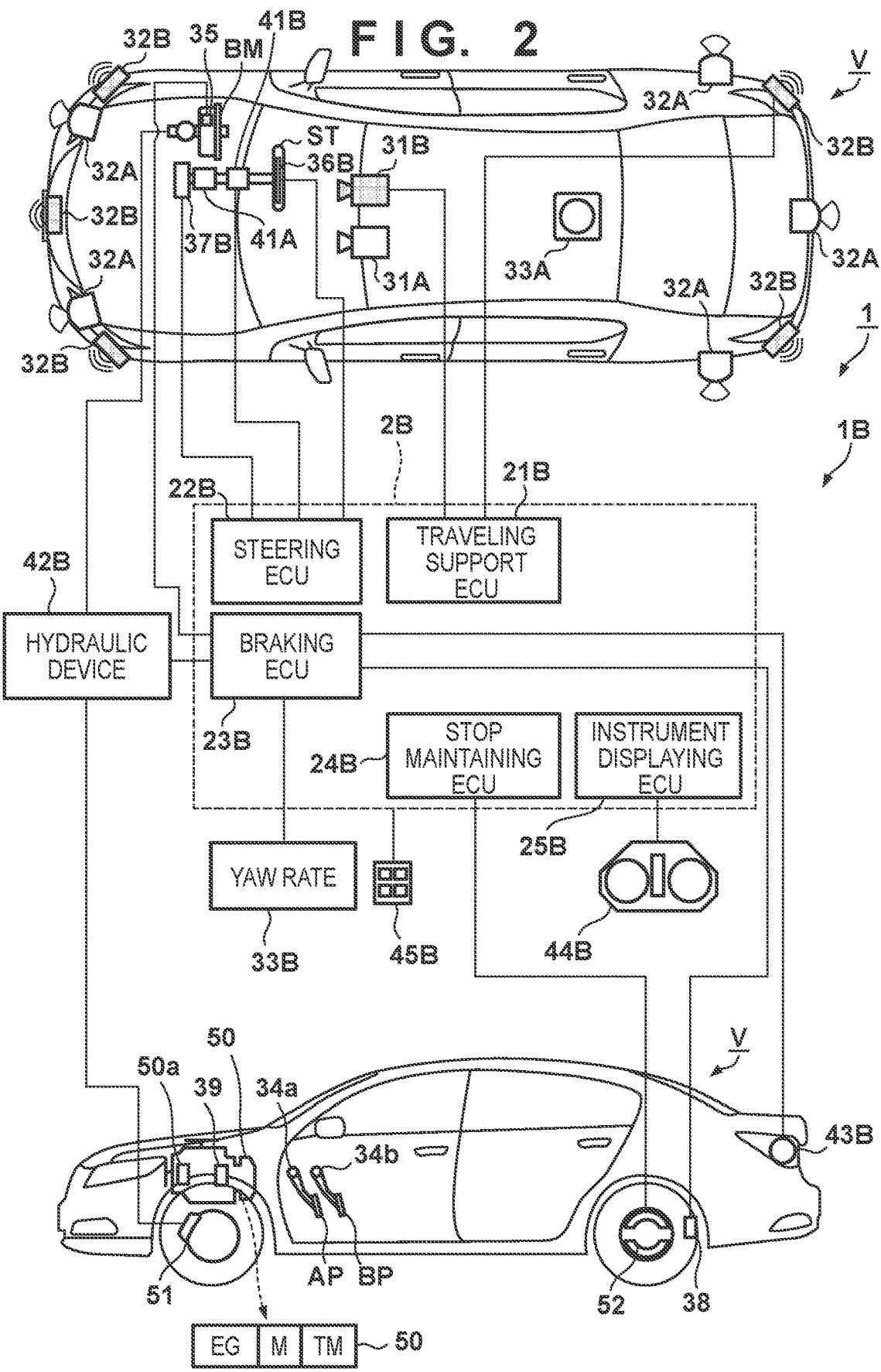
FIG. 2 is a block diagram of the vehicle control apparatus according to the embodiment.
Figure 3:
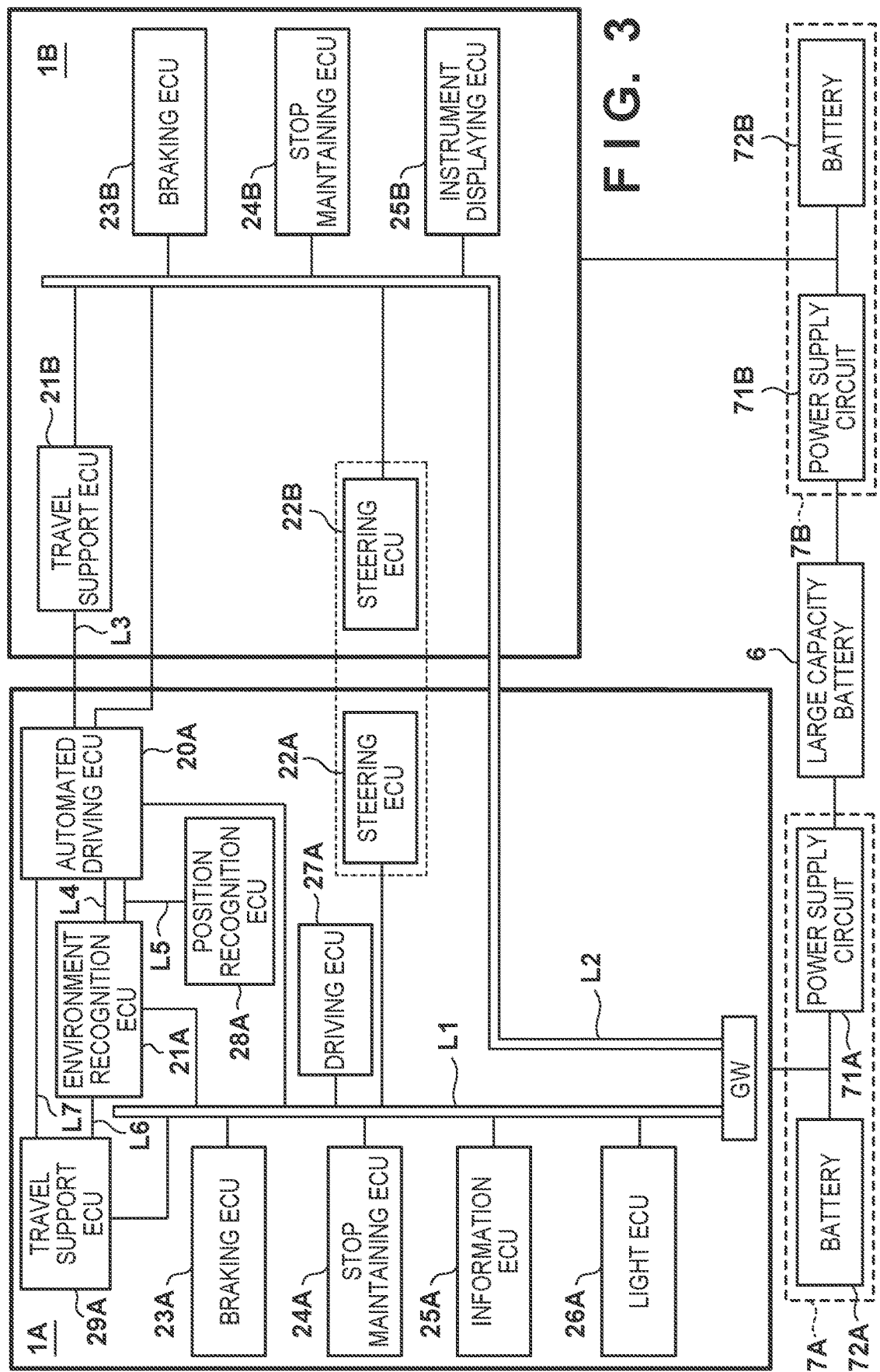
FIG. 3 is a block diagram of the vehicle control apparatus according to the embodiment.

FIGS. 1 to 4 are block diagrams of a vehicle control apparatus 1 according to an embodiment of the present invention. The vehicle control apparatus 1 controls a vehicle V. In each of FIGS. 1 and 2, an outline of the vehicle V is shown in a plan view and a side view. As an example, the vehicle V is a sedan-type four-wheeled vehicle. The vehicle control apparatus 1 includes a control apparatus 1A and a control apparatus 1B. FIG. 1 is a block diagram showing the control apparatus 1A, and FIG. 2 is a block diagram showing the control apparatus 1B. FIG. 3 mainly show's the arrangement of communication lines between the control apparatus 1A and the control apparatus 1B and power supplies.

The control apparatus 1A and the control apparatus 1B make some functions implemented by the vehicle V multiplexed or redundant. This can improve the reliability of the vehicle control apparatus. The control apparatus 1A performs, for example, not only automated driving control and normal operation control in manual driving but also travel support control concerning emergency avoidance and the like. The control apparatus 1B mainly performs travel support control concerning emergency avoidance and the like. Travel support, will be sometimes referred to as driving support. The control apparatus 1A and the control apparatus 1B are caused to perform different control processes while making the functions redundant, thereby improving the reliability while distributing the control processes.

The vehicle V according to this embodiment is a parallel hybrid vehicle. FIG. 2 schematically shows the arrangement of a power plant 50 that outputs a driving force to rotate the driving wheels of the vehicle V. The power plant 50 includes an internal combustion engine EG, a motor M, and an automatic transmission TM. The motor M is usable as a driving source to accelerate the vehicle V and is also usable as a power generator upon deceleration or the like (regenerative braking), <Control Apparatus 1A>

The arrangement of the control apparatus 1A will be described with reference to FIG. 1. The control apparatus 1A functions as a first control apparatus that performs travel control of the vehicle V. The control apparatus 1A includes an ECU group (control unit group) 2A. The ECU group 2A includes a plurality of ECUs 20A to 29A. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces. Note that the number of ECUs and the provided functions can appropriately be designed, and they can be subdivided or integrated as compared to this embodiment. Note that in FIGS. 1 and 3, the names of the representative functions of the ECUs 20A to 29A are given. For example, the ECU 20A is denoted by "automated driving ECU".

The ECU 20A executes control associated with automated driving as travel control of the vehicle V. In automated driving, at least one of driving (acceleration of the vehicle V by the power plant 50, and the like), steering, and braking of the vehicle V is automatically performed independently of the driving operation of the driver. In this embodiment, driving, steering, and braking are automatically performed.

The ECU 21A is an environment recognition unit configured to recognize the travel environment of the vehicle V based on the detection results of detection units 31A and 32A that detect the peripheral situation of the vehicle V. The ECU 21A generates target data (to be described later) as peripheral environment information.

In this embodiment, the detection unit 31A is an image capturing device (to be sometimes referred to as the camera 31A hereinafter) configured to detect an object around the vehicle V by image capturing. The camera 31A is provided at the roof front portion in the vehicle V to capture the front side of the vehicle V. When images captured by the camera 31A are analyzed, the contour of a target or a division line (a white line or the like) of a lane on a road can be extracted.

In this embodiment, the detection unit 32A is a LiDAR (Light Detection and Ranging) (to be sometimes referred to as the LiDAR 32A hereinafter) configured to detect an object around the vehicle V by light, and detects a target around the vehicle V or measures the distance to a target. In this embodiment, five LiDARs 32A are provided; one at each corner of the front portion of the vehicle V, one at the center of the rear portion, and one on each side of the rear portion. The number of LiDARs 32A and their arrangement can appropriately be selected.

The ECU 29A is a travel support unit configured to execute control associated with travel support (in other words, driving support) as travel control of the vehicle V based on the detection result of the detection unit 31A.

The ECU 22A is a steering control unit configured to control an electric power steering device 41A (to be also simply referred to as a "first steering device"). The electric power steering device 41A includes a mechanism that steers the front wheels in accordance with the driving operation (steering operation) of the driver on a steering wheel ST. The electric power steering device 41A includes a motor that generates a driving force to assist the steering operation or automatically steer the front wheels, and pieces of information detected by a sensor that detects the rotation amount of the motor, a torque sensor that detects the steering torque on the driver, and the like are input to the ECU 22A. Also, a steering angle sensor 37A is electrically connected to the ECU 22A via a communication line L2 (to be described later), and the electric power steering de vice 41A can be controlled based on the detection result of the steering angle sensor 37A. The ECU 22A can monitor the steering wheel gripping state of the driver by obtaining the detection result of a grip sensor 36A that detects whether the driver is gripping the steering wheel ST.

The ECU 23A is a braking control unit configured to control a hydraulic device 42A (to be also referred to as a "first hydraulic device 42A"). The hydraulic device 42A implements, for example, an ESB (Electric Servo Brake). A braking operation of the driver on a brake pedal BP is converted into a fluid pressure by a brake master cylinder BM and transmitted to the hydraulic device 42A. The hydraulic device 42A is an actuator capable of controlling, based on the fluid pressure transmitted from the brake master cylinder BM, the fluid pressure of hydraulic oil to be supplied to a brake device (for example, a disc brake device) 51 provided in each of the four wheels. The ECU 23A performs driving control of a solenoid valve and the like provided in the hydraulic device 42A. The detection information from an ESB sensor 142A that detects the driving state of the solenoid valve and the like provided in the hydraulic device 42A is input to the ECU 23A. In this embodiment, the ECU 23A and the hydraulic device 42A form an electric servo brake. The ECU 23A controls, for example, the distribution of a braking force by the four brake devices 51 and a braking force by regenerative braking of the motor M. A wheel speed sensor 38 provided in each of the four wheels is electrically connected to the ECU 23A, and the distribution of the braking force can be controlled based on the detection results of the ESB sensor 142A and the wheel speed sensors 38.

The ECU 24A is a stop maintaining control unit configured to control an electric parking lock device 50a provided in the automatic transmission TM. The electric parking lock device 50a includes a mechanism that locks the internal mechanism of the automatic transmission TM mainly when the P range (Park range) is selected. The ECU 24A can control lock and unlock by the electric parking lock device 50a.

The ECU 25A is an in-vehicle notification control unit configured to control an information output device 43A for performing information notification to occupants in the vehicle. The information output device 43A includes, for example, a display device such as a head-up display and a sound output device. The information output device 43A may further include a vibration device. Tire ECU 25A causes the information output device 43A to output, for example, various kinds of information such as a vehicle speed and an atmospheric temperature and information such as a path guidance.

The ECU 26A is an external notification control unit configured to control an information output device 44A that performs information notification to the outside of the vehicle. In this embodiment, the information output device 44A is a direction indicator (hazard lamp). The ECU 26A controls blinking of the information output device 44A serving as a direction indicator, thereby notifying the outside of the vehicle of the advancing direction of the vehicle V. In addition, the ECU 26A controls blinking of the information output device 44A serving as a hazard lamp to increase the attention of the outside to the vehicle V.

The ECU 27A is a driving control unit configured to control the power plant 50. In this embodiment, one ECU 27A is assigned to the power plant 50. However, one ECU may be assigned to each of the internal combustion engine EG, the motor M, and the automatic transmission TM. The ECU 27A controls the output of the internal combustion engine EG or the motor M or switches the gear range of the automatic transmission TM in correspondence with, for example, the driving operation of the driver detected by an operation detection sensor 34a provided on an accelerator pedal AP or an operation detection sensor 34b provided on the brake pedal BP, the vehicle speed, or the like. Note that as a sensor that detects the travel state of the vehicle V, a rotation speed sensor 39 that detects the rotation speed of the output shaft of the automatic transmission TM is provided in the automatic transmission TM. The vehicle speed of the vehicle V can be calculated from the detection result of the rotation speed sensor 39.

The ECU 28A is a position recognition unit configured to recognize the current position or the route of the vehicle V. The ECU 28A performs control of a gyro sensor 33A, a GPS sensor 28b, and a communication device 28c and information processing of a detection result or a communication result. The gyro sensor 33A detects the rotary motion of the vehicle V. The route of the vehicle V can be determined based on the detection result of the gyro sensor 33A, and the like. The GPS sensor 28b detects the current position of the vehicle V. The communication device 28c performs wireless communication with a server configured to provide map information and traffic information, and acquires these pieces of information. A database 28a can store accurate map information. The ECU 28A can more accurately specify the position of the vehicle V on a lane based on the map information and the like.

An input device 45A is arranged in the vehicle so as to be operable by the driver, and accepts input of an instruction or information from the driver.

<Control Apparatus 1B>

The arrangement of the control apparatus 1B will be described with reference to FIG. 2. The control apparatus 1B functions as a second control apparatus that performs travel control of the vehicle V. The control apparatus 1B includes an ECU group (control unit group) 2B. The ECU group 2B includes a plurality of ECUs 21B to 25B. Each ECU includes a processor represented by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces. Note that the number of ECUs and the provided functions can appropriately be designed, and they can be subdivided or integrated as compared to this embodiment. Note that in FIGS. 2 and 3, the names of the representative functions of the ECUs 21B to 25B are given, like the ECU group 2A.

The ECU 21B is an environment recognition unit configured to recognize the travel environment of the vehicle V based on the detection results of detection units 31B and 32B that detect the peripheral situation of the vehicle V, and also serves as a travel support unit configured to execute control associated with travel support (in other words, driving support) as travel control of the vehicle V. The ECU 21B generates target data (to be described later) as peripheral environment information.

Note that in this embodiment, the ECU 21B has the environment recognition function and the travel support function. However, an ECU may be provided for each function, like the ECU 21A and the ECU 29A of the control apparatus 1A. Conversely, in the control apparatus 1A, the functions of the ECU 21A and the ECU 29A may be implemented by one ECU, like the ECU 21B.

In this embodiment, the detection unit 31B is an image capturing device (to be sometimes referred to as the camera 31B hereinafter) configured to detect an object around the vehicle V by image capturing. The camera 31B is provided at the roof front portion in the vehicle V to capture the front side of the vehicle V, When images captured by the camera 31B are analyzed, the contour of a target or a division line (a white line or the like) of a lane on a road can be extracted. In this embodiment, the detection unit 32B is a millimeter wave radar (to be sometimes referred to as the radar 32B hereinafter) configured to detect an object around the vehicle V by a radio wave, and detects a target around the vehicle V or measures the distance to a target. In this embodiment, five radars 32B are provided; one at the center of the front portion of the vehicle V, one at each corner of the front portion, and one at each corner of the rear portion. The number of radars 32B and their arrangement can appropriately be selected.

The ECU 22B is a steering control unit configured to control the electric power steering device 41B (to be also simply referred to as a "second steering device" hereinafter). The electric power steering device 41B includes a mechanism that steers the front wheels in accordance with the driving operation (steering operation) of the driver on the steering wheel ST. The electric power steering device 41B includes a motor that generates a driving force to assist the steering operation or automatically steer the front wheels, and pieces of information detected by a sensor that detects the rotation amount of the motor, a torque sensor that detects the steering torque on the driver, and the like are input to the ECU 22B. In addition, a steering angle sensor 37B is electrically connected to the ECU 22B via the communication line L2 (to be described later), and the electric power steering device 41B can be controlled based on the detection result of the steering angle sensor 37B. The ECU 22B can obtain the detection result of a grip sensor 36B that detects whether the driver is gripping the steering wheel ST, and can monitor the steering wheel gripping state of the driver.

The ECU 23B is a braking control unit configured to control a hydraulic device 42B (to be also referred to as a "second hydraulic device 42B"). The hydraulic device 42B functions as an anti-skid device and implements, for example, VSA (Vehicle Stability Assist). A braking operation of the driver on the brake pedal BP is converted into a fluid pressure by the brake master cylinder BM and transmitted to the hydraulic device 42B. The hydraulic device 42B is an actuator capable of controlling, based on the fluid pressure transmitted from the brake master cylinder BM, the fluid pressure of hydraulic oil to be supplied to the brake device 51 of each wheel. The ECU 23B performs driving control of a solenoid valve and the like provided in the hydraulic device 42B. The detection information of a VSA sensor 142B that detects the driving state of the solenoid valve and the like provided m the hydraulic device 42B is input to the ECU 23B.

In this embodiment, the wheel speed sensor 38 provided in each of the four wheels, a yaw rate sensor 33B, and a pressure sensor 35 configured to detect the pressure in the brake master cylinder BM are electrically connected to the ECU 23B and the hydraulic device 42B, and an ABS function, traction control, and the posture control function for the vehicle V are implemented based on the detection results of these sensors. For example, the ECU 23B adjusts the braking force of each wheel based on the detection result of the wheel speed sensor 38 provided in each of the four wheels, thereby suppressing the skid of each wheel. In addition, the ECU 23B adjusts the braking force of each wheel based on the rotation angular speed about the vertical axis of the vehicle V detected by the yaw rate sensor 33B, thereby suppressing an abrupt posture change of the vehicle V.

The ECU 23B also functions as an external alarm control unit configured to control an information output device 43B that alarms information outside the vehicle. In this embodiment, the information output device 43B is a brake lamp, and the ECU 23B can tight the brake lamp at the time of braking or the like. This can increase the attention of a following vehicle to the vehicle V.

The ECU 24B is a stop maintaining control unit configured to control an electric parking brake device (for example, a drum brake) 52 provided in each rear wheel. The electric parking brake device 52 includes a mechanism that locks the rear wheel. The ECU 24B can control lock and unlock of the rear wheels by the electric parking brake devices 52.

The ECU 25B is an in-vehicle alarm control unit configured to control an information output device 44B that alarms information in the vehicle. In this embodiment, the information output device 44B includes a display device arranged on the instrument panel. The ECU 25B can cause the information output device 44B to output various kinds of information such as a vehicle speed and fuel consumption.

An input device 45B is arranged in the vehicle so as to be operable by the driver, and accepts input of an instruction or information from the driver.

<Communication Lines>

An example of communication lines of the vehicle control apparatus 1, which communicably connect the ECUs, will be described with reference to FIG. 3. The vehicle control apparatus 1 includes communication lines L1 to L7 of wired communication. The ECUs 20A to 27A and 29A of the control apparatus 1A are connected to the communication line L1. Note that the ECU 28A may also be connected to the communication line L1.

The ECUs 21B to 25B of the control apparatus 1B are connected to the communication line L2. The ECU 20A of the control apparatus 1A is also connected to the communication line L2. The communication line L3 (the first communication line) connects the ECU 20A and the ECU 21B. The communication line L4 connects the ECU 20A and the ECU 21A. The communication line L5 connects the ECU 20A, the ECU 21A, and the ECU 28A, The communication line L6 connects the ECU 29A and the ECU 21A. The communication line L7 connects the ECU 29A and the ECU 20A.

The protocols of the communication lines L1 to L7 may be identical or different, and may be changed in accordance with the communication environment such as a communication speech a communication amount, and durability. For example, the communication lines L3 and L4 may be Ethernet® from the viewpoint of communication speed. For example, the communication lines L1, L2, and L5 to L7 may be CAN.

The control apparatus 1A includes a gateway GW. The gateway GW relays the communication line L1 and the communication line L2. For this reason, for example, the ECU 21B can output a control instruction to the ECU 27A via the communication line L2, the gateway GW, and the communication line L1.

<Power Supply>

The power supply of the vehicle control apparatus 1 will be described with reference to FIG. 3. The vehicle control apparatus 1 includes a large capacity battery 6, a power supply 7A, and a power supply 7B. The large capacity battery 6 is a battery used to drive the motor M and charged by the motor M.

The power supply 7A is a power supply that supplies power to the control apparatus 1A, and includes a power supply circuit 71A and a battery 72A. The power supply circuit 71A is a circuit that supplies the power of the large capacity battery 6 to the control apparatus 1A, and, for example, lowers the output voltage (for example, 190 V) of the large capacity battery 6 to a reference voltage (for example, 12 V). The battery 72A is a lead battery of, for example, 12 V. Since the battery 72A is provided, the power can be supplied to the control apparatus 1A even in a case in which the power supply of the large capacity battery 6 or the power supply circuit 71A is shut down or lowers.

The power supply 7R is a power supply that supplies power to the control apparatus 1B, and includes a power supply circuit 71B and a battery 72B. The power supply circuit 71B is a circuit that is similar to the power supply circuit 71A and supplies the power of the large capacity battery 6 to the control apparatus 1B, The battery 72B is a battery similar to the battery 72A, and is a lead battery of, for example, 12 V. Since the battery 72B is provided, the power can be supplied to the control apparatus 1B even in a case in which the power supply of the large capacity battery 6 or the power supply circuit 71B is shut down or lowers, <Overall Arrangement>

The overall arrangement of the vehicle V will be described from another viewpoint with reference to FIG. 4. The vehicle V includes the control apparatus 1A (the first control apparatus), the control apparatus 1B (the second control apparatus), an external recognition device group 82, an actuator group 83, and a first vehicle information detection unit 155A and a second vehicle information detection unit 155B for detecting the state information of the vehicle V. In the vehicle control apparatus 1 according to this embodiment, the control apparatus 1A (the first control apparatus) and the control apparatus 1B (the second control apparatus) perform travel control of the vehicle V.

Figure 4:
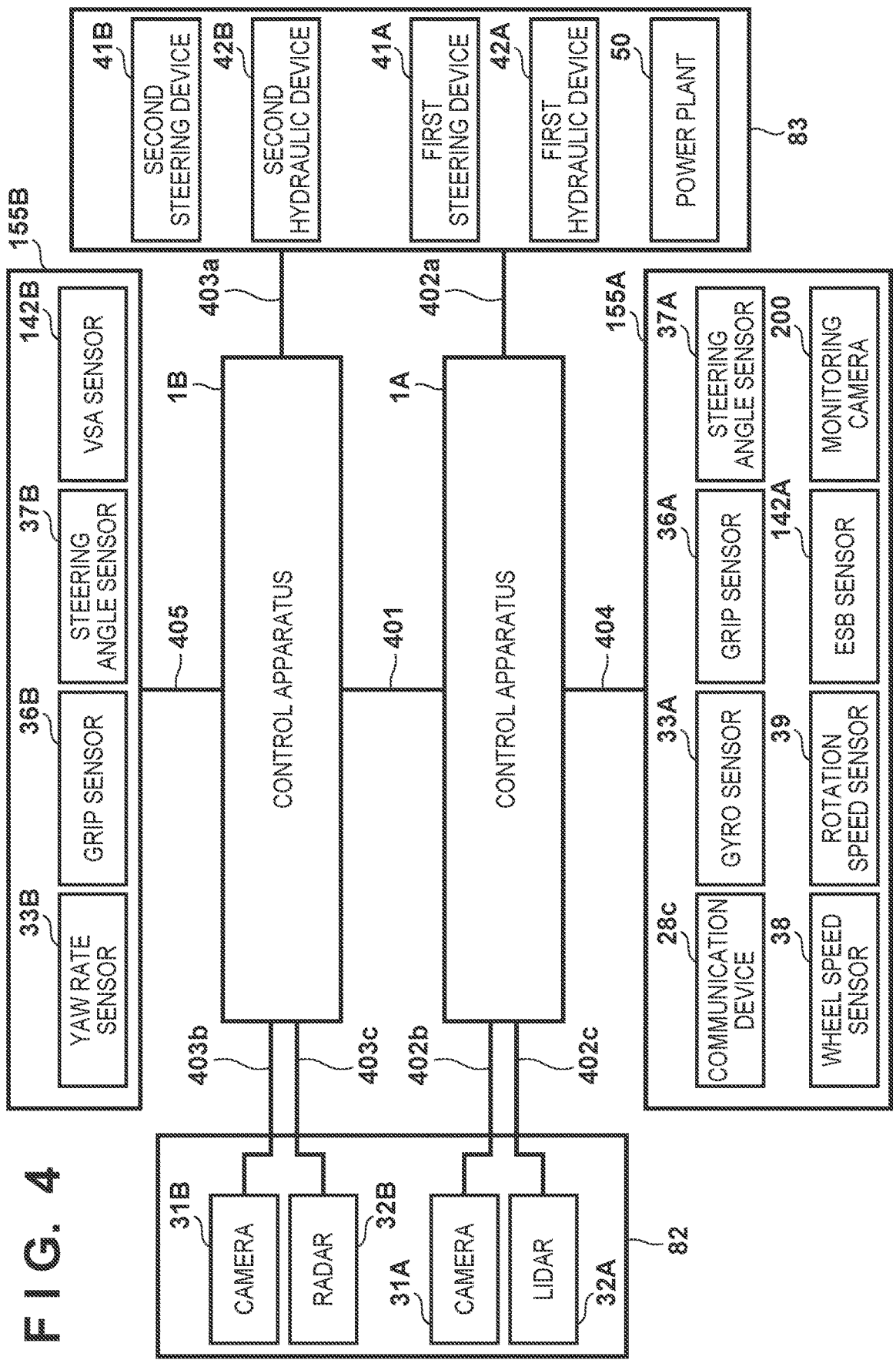
FIG. 4 is a block diagram of the vehicle control apparatus according to the embodiment.

As shown in FIG. 4, the control apparatus 1A (the first control apparatus) and the control apparatus 1B (the second control apparatus) are connected by a communication line 401 (the first communication line) and can communicate with each other, in this case, the communication line 401 corresponds to the communication line L3 of FIG. 3.

The actuator group 83 functions as an operation unit that operates based on a control signal transmitted from the control apparatus 1A (the first control apparatus) or the control apparatus 1B (the second control apparatus). The control apparatus 1A and the actuator group 83 (the operation unit) are connected by a communication line 402a (the second communication line), and the actuator group 83 (the electric power steering device 41A, the first hydraulic device 42A, and the power plant 50) can be operated by a control signal transmitted from the control apparatus 1A (the first control apparatus). In addition, the control apparatus 1B (the second control apparatus) and the actuator group 83 (the operation unit) are connected by a communication line 403a (the third communication line), and the actuator group 83 (the electric power steering device 41B and the second hydraulic device 42B) can be operated by a control signal transmitted from the control apparatus 1B (the second control apparatus).

The external recognition device group 82 is a set of external recognition devices (sensors) mounted on the vehicle V. The external recognition device group 82 includes the above-described cameras 31A and 31B, LiDAR 32A, and radar 32B. The camera 31A and the LiDAR 32A are connected to the control apparatus 1A (the first control apparatus) via a communication line 402b and a communication line 402c. Pieces of external information obtained by the camera 31A and the LiDAR 32A and information concerning these devices are supplied to the control apparatus 1A, and the camera 31A and the LiDAR 32A operate in accordance with an instruction (control signal) from the control apparatus 1A.

The camera 31B and the radar 32B are connected to the control apparatus 1B (the second control apparatus) by a communication line 403b and a communication line 403c, respectively. Pieces of external information obtained by the camera 31B and the radar 32B and information concerning these devices are supplied to the control apparatus 1B, and the camera 31B and the radar 32B operate in accordance with an instruction (control signal) from the control apparatus 1B. The control apparatus 1B may supply the pieces of external information obtained by the camera 31B and the radar 32B to the control apparatus 1A via the communication line 401 (the first communication line). This enables the control apparatus 1A to execute automated driving control using the pieces of external information obtained from each of the cameras 31A and 31B, LiDAR 32A, and radar 32B.

The actuator group 83 (the operation unit) is a set of actuators mounted on the vehicle V. The actuator group 83 includes, for example, the electric power steering device 41A (the first steering device), the electric power steering device 41B (the second steering device), the hydraulic device 42A (the first hydraulic device), the hydraulic device 42B (the second hydraulic device), and the power plant 50 described above.

Pieces of information related to the electric power steering device 41. A, the first hydraulic device 42A, and the power plant 50 are supplied to the control apparatus 1A (the first control apparatus) via the communication line 402a (second communication line), and the electric power steering device 41A, the first hydraulic device 42A, and the power plant 50 operate in accordance with an instruction (control signal) from the control apparatus 1A. In addition, pieces of information related to the electric power steering device 41B and the second hydraulic device 42B are supplied to the control apparatus 1B (the second control apparatus) via the communication line 403a (the third communication line), and the electric power steering device 41B and the second hydraulic device 42B operate in accordance with an instruction (control signal) from the control apparatus 1B.

The power plant 50 drives the vehicle V, and is thus a kind of longitudinal control actuator. Furthermore, the power plant 50 can change the direction of the vehicle V by changing the distribution of the driving forces of the left and right wheels, and is thus a kind of lateral control actuator. Each of the hydraulic devices 42A and 42B performs braking of the vehicle V, and is thus a kind of longitudinal control actuator. Furthermore, each of the hydraulic devices 42A and 42B can change the direction of the vehicle V by brake torque vectoring, and is thus a kind of lateral control actuator. Each of the electric power steering devices 41A and 41B controls steering of the vehicle Y, and is thus a kind of lateral control actuator.

The control apparatus 1A (the first control apparatus) can communicate with some of the devices (for example, the electric power steering device 41A, the first hydraulic device 42A, and the power plant 50) of the actuator group 83 via the communication line 402a (the second communication line). Also, the control apparatus 1B (the second control apparatus) can communicate with some of the devices (for example, the electric power steering device 41B and the second hydraulic device 42B) of the actuator group 83 via the communication line 403a (the third communication line). The communication line 401 to a communication line 404 are, for example, a CAN (Controller Area Network) but may also be Ethernet®. Alternatively, both the CAN and Ethernet® may be used to connect the devices.

The first vehicle information detection unit 155A that obtains the state information of the vehicle includes, as one example, the communication device 28c, the gyro sensor 33A, the grip sensor 36A, the steering angle sensor 37A, the wheel speed sensor 38, the rotation speed sensor 39, the ESB sensor 142A which detects the driving state of the solenoid value and the like included in the first hydraulic device 42A (the first hydraulic device), and a monitoring camera 200 which monitors the driving state of the driver.

The sensors and camera included in the first vehicle information detection unit 155A are connected to the control apparatus 1A via various kinds of communication lines. In FIG. 4, the communication line 404 that connects the first vehicle information detection unit 155A to the control apparatus 1A is shown as a representative of these communication lines.

In addition, the second vehicle information detection rant 155B that obtains the state information of the vehicle includes, as one example, the yaw rate sensor 33B, the grip sensor 36B, the steering angle sensor 37B, and the VSA sensor 142B which detects the driving state of the solenoid valve and the like included in the second hydraulic device 42B (the second hydraulic device). The sensors included in the second vehicle information detection unit 155B are connected to the control apparatus 1B via various kinds of communication lines. In FIG. 4, a communication line 405 that connects the second vehicle information detection unit 155B to the control apparatus 1B is shown as a representative of these communication lines.

If degradation of at least one of the functions of the external recognition device group 82, the actuator group 83, and the first vehicle information detection units 155A and 155B is detected based on the recognition result of the external recognition device group 82 (the detection unit 31A and the LiDAR 32A which function as external recognition units) and the detection result of the first vehicle information detection units 155A and 155B, the control apparatus 1A will determine the contents of the vehicle control to be performed in fallback control for restricting travel control functions of the vehicle and determine whether the fallback control is to be executed by the control apparatus 1A or the control apparatus 1B. Here, the control apparatus 1A can communicate with the control apparatus S B to determine, based on the recognition result of the external recognition device group 82 (the camera 31B and the radar 32B which function as external recognition units) or the detection result of the second vehicle information detection unit 155B, the contents of the vehicle control in the fallback control and whether the fallback control is to be executed by the control apparatus 1A or the control apparatus 1B.

<Processing>

Figure 5:
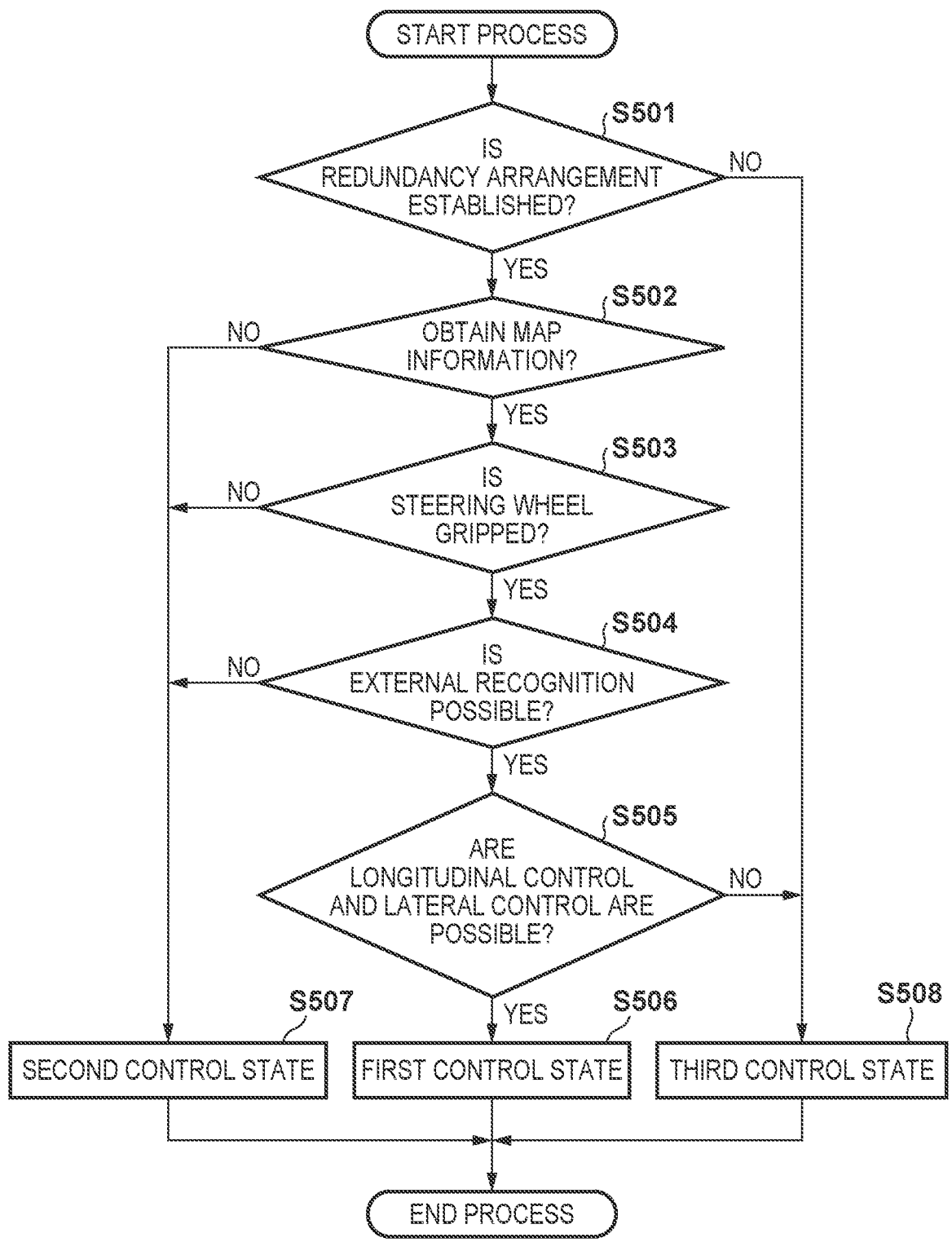
FIG. 5 is a flowchart for explaining the procedure of processing of the vehicle control apparatus according to the embodiment.

The processing of the control apparatus 1A in the vehicle control apparatus 1 will be described next. FIG. 5 is a flowchart for explaining the procedure of processing of the vehicle control apparatus 1.

In step S501, the control apparatus 1A determines, based on the recognition result of the external recognition device group 82 which obtains the external information of the vehicle and the detection result of the first vehicle information detection units 155A and 155B which obtain the state information of the actuator group 83 in the vehicle V, whether a redundancy arrangement is established in the vehicle V. For example, if degradation of the detection function of the camera 31A or 31B forming the external recognition device group 82 is determined, it will be determined that a redundancy arrangement is not established (NO in step S501), and the process will advance to step S508.

On the other hand, in the determination of step S501, if the establishment of a redundancy arrangement in the vehicle V (YES in step S501) is determined based on the recognition result of the external recognition device group 82 and the detection result of the first vehicle information detection units 155A and 155B, the process will advance to step S502.

In step S502, in a case in which map information cannot be obtained via the communication device 28c in a travel control state (this control state will be referred to as a "first control state" hereinafter) by automated driving (NO in step S502), the control apparatus 1A advances the process to step S507. The control apparatus 1A functions as the mam subject of control execution, and changes the control state of the automated driving of the vehicle from the first control state to a second control state.

The first control state (for example, Lv2B2 or Lv3) here is a control state which has a high vehicle control automation rate or a low degree of vehicle operation contribution required of the driver compared to the second control state (Lv2B1). The control apparatus 1A will cause, as fallback control, the vehicle V to stop in the travel lane.

If the map information is obtained in the determination of step S502 (YES in step S502), the process advances to step S503.

In step S503, if degradation of the detection function of the grip sensor 36A, as the first vehicle information detection unit 155A, for detecting whether the driver is gripping the steering wheel of the vehicle V or degradation of the detection function of the monitoring camera 200, as the first vehicle information detection unit 155A, for monitoring the direction of the face of the driver has degraded is determined (NO in step S503), the control apparatus 1A will advance the process to step S507. The control apparatus 1A will function as the main subject of control execution to change the control state of the automated driving of the vehicle from the first control state to the second control state, and the control apparatus 1A will cause, as fallback control, the vehicle V to stop on the shoulder of the travel lane.

If the grip sensor 36A and the monitoring camera 200 are operating normally in the determination of the step S503 (YES in step S503), the process advances to step S504.

In step S504, if degradation of the function of the external recognition device group 82 is determined based on the recognition result of the external recognition device group 82 (NO in step S504), the control apparatus 1A will advance the process to step S507. The control apparatus 1A will function as the main subject of control execution to change the control state of the automated driving of the vehicle from the first control state to the second control state, and the control apparatus 1A will cause, as fallback control, the vehicle V to stop in the travel lane.

If the external recognition device group 82 is operating normally in the determination of step S504 (YES in step S504), the process advances to step S505.

In step S505, the control apparatus 1A determines, based on the detection result of the first vehicle information detection unit 155A or the detection result of the second vehicle information detection unit 155B obtained via communication with the control apparatus 1B, whether longitudinal control and lateral control of the vehicle V can be performed.

Since the power plant 50 shown in the block diagram of FIG. 4 performs driving of the vehicle V, it is a kind of a longitudinal control actuator. Furthermore, since the power plant 50 can change the direction of the vehicle V by changing the distribution of the driving forces of the left and right wheels, it is a kind of a lateral control actuator. Since each of the first hydraulic device 42A (the first hydraulic device) and the second hydraulic device 42B (the second hydraulic device) performs braking of the vehicle V, each of these devices is a kind of a longitudinal control actuator.

In addition, since each of the first hydraulic device 42A (the first hydraulic device) and the second hydraulic device 42B (the second hydraulic device) can change the direction of the vehicle V by brake torque vectoring, each of these devices is a kind of lateral control actuator. Furthermore, since each of the electric power steering device 41A (the first steering device) and the electric power steering device 41B (the second steering device) controls steering of the vehicle V, each of these devices can function as a lateral control actuator.

The following example can be raised as an example of determination performed by the control apparatus 1A in the process of this step. For example, if degradation of the detection function of the wheel speed sensor 38, as the first vehicle information detection unit 155A, provided in each of the four wheels of the vehicle V is determined, the control apparatus 1A will determine that the longitudinal control and the lateral control cannot be executed (NO in step S505), and the process advances to step S508. The control apparatus 1A will function as the main subject of control and cause, as fallback control, the vehicle V to stop in the travel lane.

If degradation of the detection function of the rotation speed sensor 39, as the first vehicle information detection unit 155A, which detects the rotation speed of the output shaft of the automatic transmission TM forming the power plant 50 of the vehicle V is determined, the control apparatus 1A will determine that the longitudinal control and the lateral control cannot be executed (NO in step S505), and the process advances to step S508. The control apparatus 1A will function as the main subject of control, and cause, as fallback control, the vehicle V to stop on the shoulder of the travel lane.

If degradation of the detection function of the steering angle sensor 37A, as the first vehicle information detection unit 155A, which detects the steering angle of the vehicle V is determined, the control apparatus 1A will determine that the longitudinal control and the lateral control cannot be executed (NO in step S505), and the process advances to step S508. The control apparatus 1A will function as the main subject of control, and cause, as fallback control, the vehicle V to stop in the travel lane.

If degradation of the detection function of the yaw rate sensor 33B for detecting the rotation angular speed about the vertical axis of the vehicle V is determined by communication with the control apparatus 1B, the control apparatus 1A will determine that longitudinal control and lateral control cannot be executed (NO in step S505) and advance the process to step S508. The control apparatus 1A will function as the main subject of control and cause, as fallback control, the vehicle V to stop in the travel lane.

If it is determined, with respect to the first vehicle information detection unit 155A, that the function of the electric power steering device 41A of the vehicle V has degraded, the control apparatus 1A will change the mam subject of control to the control apparatus 1B and cause the control apparatus 1B to execute fallback control.

If the control apparatus 1A communicates with the control apparatus 1B and determines, based on the detection result of the second vehicle information detection unit 155B, the degradation of the function of the electric power steering device 41B of the vehicle V, the control apparatus 1A will function as the main subject of control and cause, as fallback control, the vehicle Y to stop on the shoulder of the travel lane.

If degradation of the function of the first hydraulic device 42A functioning as the electric servo brake is determined based on the detection result of the first vehicle information detection unit 155A, the control apparatus 1A will change the main subject of control to the control apparatus 1B and cause the control apparatus 1B to execute fallback control.

If the control apparatus 1A communicates with the control apparatus 1B and determines, based on the detection result of the second vehicle information detection unit 155B, the degradation of the function of the second hydraulic device 42B which functions as an anti-skid device of the vehicle V, the control apparatus 1A will function as the main subject of control and cause, as fallback control, the vehicle V to stop in the travel lane.

In the determination processing of step S505, if it is determined, based on the detection result of the first vehicle information detection unit 155A or the detection result of the second vehicle information detection unit 155B obtained by communicating with the control apparatus 1B, that the longitudinal control and the lateral control of the vehicle V can be performed, the control apparatus 1A will set the control state of the vehicle to the first control state. If the vehicle is traveling in the first control state, the first control state will be maintained. On the other hand, in the determination processing of step S505, if the control apparatus 1A determines that the longitudinal control and the lateral control of the vehicle V cannot be performed (NO in step S505), the process will advance to step S508, and the control apparatus 1A will function as the main subject of control execution and change the automated driving control state of the vehicle from the first control state to a third control state. Here, the third control state (for example, Lv2B2 or Lv3) is a control state which has a low vehicle control automation rate or a high degree of vehicle operation contribution required of the driver compared to the second control state (Lv2B1), The third control state includes the transition to a manual driving travel state upon completion of the automated driving control.

Other Embodiments

A vehicle control program that implements one or more functions described in the embodiments is supplied to a system or an apparatus via a network or a storage medium, and one or more processors in the computer of the system or the apparatus can load the program and execute it. The present invention can also be implemented by such a mode.

Summary of Embodiment

Arrangement 1. A vehicle control apparatus (for example, 1 of FIG. 1) according to the above-described embodiment is a vehicle control apparatus that includes a first control unit (for example, 1A of FIG. 4) and a second control unit (for example, 1B of FIG. 4) each configured to perform travel control of a vehicle based on a recognition result of an external recognition device group (for example, 82 of FIG. 4) configured to obtain external information of the vehicle and a detection result of a vehicle information detection unit (for example, 155A, 155B of FIG. 4) configured to obtain state information of an actuator group (for example, 83 of FIG. 4) of the vehicle, wherein in a case in which functional degradation of at least one of the external recognition device group (82), the actuator group (83), and the vehicle information detection unit (155A, 155B) is detected, based on the recognition result and the detection result, the first control unit (1A) determines contents of vehicle control in fallback control for restricting a travel control function of the vehicle and determines whether to execute the fallback control by one of the first control unit (1A) and the second control unit (1B). Note that fallback control may also be referred to as alternative control.

According to the vehicle control apparatus of arrangement 1, the contents of vehicle control in fallback control for restricting a travel control function of the vehicle and the main subject that is to execute the fallback control can be determined based on the recognition result of external information and the detection result of state information of the vehicle.

Arrangement 2. In the vehicle control apparatus (1) according to the above-described embodiment, in a case in which functional degradation of the external recognition device group (82) is determined based on the recognition result of the external recognition device group (82), the first control unit (1A) will cause, as the fallback control, the vehicle to stop in a travel lane.

Arrangement 3. In the vehicle control apparatus (1) according to the above-described embodiment, in a case in which functional degradation of the external recognition device group (82) is determined, the first control unit (1A) changes a control state of automated driving of the vehicle from a first control state to a second control state.

Arrangement 4. In the vehicle control apparatus (1) according to the above-described embodiment, the first control state is a control state which has one of a high vehicle control automation rate and a low degree of vehicle operation contribution required of a driver compared to the second control state.

Arrangement 5 In the vehicle control apparatus (1) according to the above-described embodiment, in a case in which degradation of a detection function of a wheel speed sensor (for example, 38 of FIG. 4), as the vehicle information detection unit (155A), provided in each of four wheels of the vehicle is determined, the first control unit (1A) causes, as the fallback control, the vehicle to stop in a travel lane.

Arrangement 6. In the vehicle control apparatus (I) according to the above-described embodiment, in a case in which degradation of a detection function of a rotation speed sensor (for example, 39 of FIG. 4), as the vehicle information detection unit (155A), configured to detect a rotation speed of an output shaft of an automatic transmission of the vehicle is determined, the first control unit (1A) causes, as the fallback control, the vehicle to stop on a shoulder of a travel lane.

Arrangement 7. In the vehicle control apparatus (1) according to the above-described embodiment, in a case in which degradation of a detection function of a steering angle sensor (for example, 37A of FIG. 4), as the vehicle information detection unit (155A), configured to detect a steering angle of the vehicle is determined, the first control unit (1A) causes, as the fallback control, the vehicle to stop in a travel lane.

Arrangement 8. In the vehicle control apparatus (1) according to the above-described embodiment, in a case in which degradation of a detection function of a yaw rate sensor (for example, 33B of FIG. 4) configured to detect a rotation angular speed about a vertical axis of the vehicle is determined based on communication with the second control unit (1B), the first control unit (1A) causes, as the fallback control, the vehicle stop in a travel lane.

Arrangement 9. In the vehicle control apparatus (1) according to the above-described embodiment, in a case in which degradation of a function of a first steering device (for example, 41A of FIG. 4) of the vehicle is determined based on the detection result of the vehicle information detection unit (155A), the first control unit (1A) causes the second control unit (1B) to execute the fallback control.

Arrangement 10, In the vehicle control apparatus (1) according to the above-described embodiment, in a case in which degradation of a function of a second steering device (for example, 41R of FIG. 4) of the vehicle is determined based on the detection result of the vehicle information detection unit (155B) by communication with the second control unit (1B), the first control unit (1A) causes, as the fallback control, the vehicle to stop on a shoulder of a travel lane.

Arrangement 11. In the vehicle control apparatus (1) according to the above-described embodiment, in a case in which degradation of a function of a first hydraulic device (for example, 42A of FIG. 4) configured to function as an electric servo brake of the vehicle is determined based on the detection result of the vehicle information detection unit (155A, for example, 142A of FIG. 4), the first control unit (1A) causes the second control unit (1B) to execute the fallback control.

Arrangement 12. In the vehicle control apparatus (1) according to the above-described embodiment, in a case in which degradation of a function of a second hydraulic device (for example, 42B of FIG. 4) configured to function as an anti-skid device of the vehicle is determined based on the detection result of the vehicle information unit (155B, for example, 142B of FIG. 4) by communication with the second control unit (1B), the first control unit (1A) causes, as the fallback control, the vehicle to stop in a travel lane.

Arrangement 13. In the vehicle control apparatus (1) according to the above-described embodiment, in a case in which map information cannot be obtained via a communication device (for example, 28c of FIG. 4) as the vehicle information detection unit (155A), the first control unit (1A) causes, as the fallback control, the vehicle to stop in a travel lane.

Arrangement 14. In the vehicle control apparatus (1) according to the above-described embodiment, in a case in which degradation of a detection function of a grip sensor (for example, 36A), as the vehicle information detection unit (155A), configured to detect whether a driver is gripping a steering wheel of the vehicle is determined, the first control unit (1A) causes, as the fallback control, the vehicle to stop on a shoulder of a travel lane.

Arrangement 15. In the vehicle control apparatus (1) according to the above-described embodiment, in a case in which degradation of a detection function of a camera (for example, 200 of FIG. 4), as the vehicle information detection unit (155A), configured to detect a state of a driver during driving is determined, the first control unit (1A) causes, as the fallback control, the vehicle to stop on a shoulder of a travel lane.

Arrangement 16. In the vehicle control apparatus (1) according to the above-described embodiment, in a case in which degradation of a function of the vehicle information detection unit is determined, the first control unit (1A) changes the control state of automated driving of the vehicle from the first control state to a third control state.

Arrangement 17. In the vehicle control apparatus (1) according to the above-described embodiment, the third control state is a control state which has one of a low vehicle control automation rate and a high degree of vehicle operation contribution required of a driver compared to the second control state.

Arrangement 18. A vehicle (for example, the vehicle V of FIG. 1) according to the above-described embodiment is a vehicle comprising a vehicle control apparatus (1) defined in Arrangement 1.

According to the vehicle of arrangement 18, a vehicle that includes a vehicle control apparatus that can determine, based on the recognition result of external information and the detection result of state information of the vehicle, the contents of vehicle control in fallback control for restricting a travel control function of the vehicle and the main subject which is to execute the fallback control can be provided.

Arrangement 19. A vehicle control method of a vehicle control apparatus according to the above-described embodiment (for example, 1 of FIG. 1) is a vehicle control method of a vehicle control apparatus that includes a first control unit (for example, 1A of FIG. 4) and a second control unit (for example, 1B of FIG. 4) each configured to perform travel control of a vehicle based on a recognition result of an external recognition device group (for example, 82 of FIG. 4) configured to obtain external information of the vehicle and a detection result of a vehicle information detection unit (for example, 155A, 155B of FIG. 4) configured to obtain state information of an actuator group (for example, 83 of FIG. 4) of the vehicle, the method comprising:

causing (for example, S501 to S505 of FIG. 5), in a case in which functional degradation of at least one of the external recognition device group (82), the actuator group (83), and the vehicle information detection unit (155A, 155B) is detected, based on the recognition result and the detection result, the first control unit (1A) to determine contents of vehicle control in fallback control for restricting a travel control function of the vehicle and determine whether to execute the fallback control by one of the first control unit (1A) and the second control unit (1B).

According to the vehicle control method of the vehicle control apparatus of arrangement 19, the contents of vehicle control in fallback control for restricting a travel control function of the vehicle and the main subject which is to execute the fallback control can be determined based on the recognition result of external information and the detection result of state information of the vehicle.

Arrangement 20. Anon-transitory computer-readable storage medium storing a program according to the above-described embodiment is a storage medium storing a program for causing a computer to execute a step of the above-described vehicle control method.

According to the storage medium storing a program of arrangement 20, a non-transitory computer-readable storage medium storing a program that can cause a computer to execute a step of a vehicle control method which can determine based on the recognition result of external information and the detection result of state information of the vehicle, the contents of vehicle control in fallback control for restricting a travel control function of the vehicle and the main subject winch is to execute the fallback control can be provided.

The invention is not limited to the foregoing embodiments, and various variations/changes are possible within the spirit of the invention.

What is claimed is:

1. A vehicle control apparatus that includes a first control unit configured to control steering and acceleration/deceleration of a vehicle; and a second control unit configured to control steering and deceleration of the vehicle and execute travel support control for the vehicle,
   wherein the first control unit is connected to the second control unit,
   a first sensor, which detects rotation of left and right wheels of the vehicle, is connected to the first control unit,
   a second sensor, which detects a number of rotations of an output shaft of the vehicle, is connected to the first control unit,
   in alternative control for restricting a travel control function of the vehicle,
   the first control unit transits a state of the vehicle to a state in which the vehicle is stopped within a travel lane or a state in which the vehicle is stopped on a shoulder of the travel lane,
   in the alternative control when a function of the first sensor is deteriorated, the first control unit transits the state of the vehicle to the state in which the vehicle is stopped within the travel lane,
   in the alternative control when a function of the second sensor is deteriorated, the first control unit transits the state of the vehicle to the state in which the vehicle is stopped on the shoulder of the travel lane.

2. The apparatus according to claim 1, wherein in a case in which functional degradation of the external recognition device group is determined based on the recognition result of the external recognition device group, the first control unit will cause, as the alternative control, the vehicle to stop in a travel lane.

3. The apparatus according to claim 2, wherein in a case in which functional degradation of the external recognition device group is determined, the first control unit changes a control state of automated driving of the vehicle from a first control state to a second control state.

4. The apparatus according to claim 3, wherein the first control state is a control state which has one of a high vehicle control automation rate and a low degree of vehicle operation contribution required of a driver compared to the second control state.

5. The apparatus according to claim 3, wherein in a case in which degradation of a function of the vehicle information detection unit is determined, the first control unit changes the control state of automated driving of the vehicle from the first control state to a third control state.

6. The apparatus according to claim 5, wherein the third control state is a control state which has one of a low vehicle control automation rate and a high degree of vehicle operation contribution required of a driver compared to the second control state.

7. The apparatus according to claim 1, wherein in a case in which degradation of a detection function of a wheel speed sensor, as the vehicle information detection unit, provided in each of four wheels of the vehicle is determined, the first control unit causes, as the alternative control, the vehicle to stop in a travel lane.

8. The apparatus according to claim 1, wherein in a case in which degradation of a detection function of a rotation speed sensor, as the vehicle information detection unit, configured to detect a rotation speed of an output shaft of an automatic transmission of the vehicle is determined, the first control unit causes, as the alternative control, the vehicle to stop on a shoulder of a travel lane.

9. The apparatus according to claim 1, wherein in a case in which degradation of a detection function of a steering angle sensor, as the vehicle information detection unit, configured to detect a steering angle of the vehicle is determined, the first control unit causes, as the alternative control, the vehicle to stop in a travel lane.

10. The apparatus according to claim 1, wherein in a case in which degradation of a detection function of a yaw rate sensor configured to detect a rotation angular speed about a vertical axis of the vehicle is determined based on communication with the second control unit, the first control unit causes, as the alternative control, the vehicle to stop in a travel lane.

11. The apparatus according to claim 1, wherein in a case in which degradation of a function of a first steering device of the vehicle is determined based on the detection result of the vehicle information detection unit, the first control unit causes the second control unit to execute the alternative control.

12. The apparatus according to claim 1, wherein in a case in which degradation of a function of a second steering device of the vehicle is determined based on the detection result of the vehicle information detection unit by communication with the second control unit, the first control unit causes, as the alternative control, the vehicle to stop on a shoulder of a travel lane.

13. The apparatus according to claim 1, wherein in a case in which degradation of a function of a first hydraulic device configured to function as an electric servo brake of the vehicle is determined based on the detection result of the vehicle information detection unit, the first control unit causes the second control unit to execute the alternative control.

14. The apparatus according to claim 1, wherein in a case in which degradation of a function of a second hydraulic device configured to function as an anti-skid device of the vehicle is determined based on the detection result of the vehicle information unit by communication with the second control unit, the first control unit causes, as the alternative control, the vehicle to stop in a travel lane.

15. The apparatus according to claim 1, wherein in a case in which map information cannot be obtained via a communication device as the vehicle information detection unit, the first control unit causes, as the alternative control, the vehicle to stop in a travel lane.

16. The apparatus according to claim 1, wherein in a case in which degradation of a detection function of a grip sensor, as the vehicle information detection unit, configured to detect whether a driver is gripping a steering wheel of the vehicle is determined, the first control unit causes, as the alternative control, the vehicle to stop on a shoulder of a travel lane.

17. The apparatus according to claim 1, wherein in a case in which degradation of a detection function of a camera, as the vehicle information detection unit, configured to detect a state of a driver during driving is determined, the first control unit causes, as the alternative control, the vehicle to stop on a shoulder of a travel lane.

18. A vehicle comprising a vehicle control apparatus defined in claim 1.

19. A vehicle control method of a vehicle control apparatus that includes a first control unit configured to control steering and acceleration/deceleration of a vehicle and a second control unit configured to control steering and deceleration of the vehicle and execute driving support control for the vehicle,
   wherein the first control unit is connected to the second control unit,
   a first sensor, which detects rotation of left and right wheels of the vehicle, is connected to the first control unit, as an information acquisition sensor,
   a second sensor, which detects a number of rotations of an output shaft of the vehicle, is connected to the first control unit,
   in alternative control for restricting a travel control function of the vehicle,
   the first control unit transits a state of the vehicle to a state in which the vehicle is stopped within a travel lane or a state in which the vehicle is stopped on a shoulder of the travel lane,
   the method comprising:
      transiting the state of the vehicle to the state in which the vehicle is stopped within the travel lane, in the alternative control when a function of the first sensor is deteriorated, and
      transiting the state of the vehicle to the state in which the vehicle is stopped on the shoulder of the travel lane, in the alternative control when a function of the second sensor is deteriorated.

20. A non-transitory computer-readable storage medium storing a program for causing a computer to execute a step of a vehicle control method defined in claim 19.

* * * * *